United States Patent [19]

Gaven et al.

[11] 3,786,189

[45] Jan. 15, 1974

[54] TELEPHONE ANNOUNCING AND MESSAGE RECORDING MACHINE

[75] Inventors: Thomas J. Gaven, Livingston; Harry E. Crocker, Irvington; Edward Feldman, Teaneck, all of N.J.

[73] Assignee: McGraw-Edison Company, Elgin, Ill.

[22] Filed: Jan. 7, 1972

[21] Appl. No.: 216,071

[52] U.S. Cl. .............................. 179/6 R, 274/15 R

[51] Int. Cl. ........................ H04m 1/64, G11b 17/06

[58] Field of Search .................. 179/6 R, 6 AC, 6 E, 179/100.1 DR; 274/9 RA, 13 R, 14, 15 R, 20, 21, 22

[56] References Cited

UNITED STATES PATENTS

| | | | |
|---|---|---|---|
| 3,051,492 | 8/1962 | Crocker | 274/14 |
| 2,800,531 | 7/1957 | Kobler | 179/100.1 DR |
| 2,835,737 | 5/1958 | Shively | 179/6 R |

*Primary Examiner*—Raymond F. Cardillo, Jr.
*Attorney*—George H. Fritzinger

[57] ABSTRACT

A telephone announcing and message recording apparatus comprises an announcing instrument having a turntable with a square recess open at one side to receive a square record faced with a magnetic coating. In the bottom wall of the turntable is a notch engageable by a latch relay which also controls the power to the drive motor to stop the turntable always in the same load-unload position. During recording of an announcement by a user on a first part of the record a tone arm and a memory arm are moved in unison, but upon shifting the instrument out of recording at the end of the announcement the memory arm is disengaged from the tone arm and latched in its operated position, and the instrument continues to run to the end of the record only to perform a timing function. When the machine is placed in telephone answering condition it first plays back the announcement to the subscriber responsive to a ringing signal. When, thereupon, the tone arm passes the memory arm a switch is operated to connect the telephone line to a message recorder and a signal is fed on the line to apprise the subscriber that a message may now be recorded. At the end of the recording of a message another signal is fed into the line and the tone arm returned to start position.

10 Claims, 6 Drawing Figures

TELEPHONE ANNOUNCING AND MESSAGE RECORDING MACHINE

An object of the invention is to provide a telephone announcing and message control instrument which uses records of a very convenient size and shape for easy handling and storage.

Another object is to provide an economical form of such instrument which uses very simple mechanism and circuitry.

Another object is to provide such an instrument which can be utilized to record any desired announcement and which is utilized thereupon to control a message recorder.

Another object is to provide such instrument which is settable into automatic condition to respond to a ringing signal to play back the recorded announcement, then to indicate by a momentary signal that a message recorder is started and ready to record any desired message from the subscriber, and then to indicate by another buzzer signal that the recording period for the message has ended whereupon the instrument is returned for another automatic cycle.

Still further, it is an object to provide a manually settable memory arm for signifying the end of the announcement interval and another manually settable stop for signifying the end of the message recording interval.

These and other objects and features of the invention will be apparent from the following description and the appended claims.

In the description of our invention, reference is had to the accompanying drawings of which:

Figure 1:
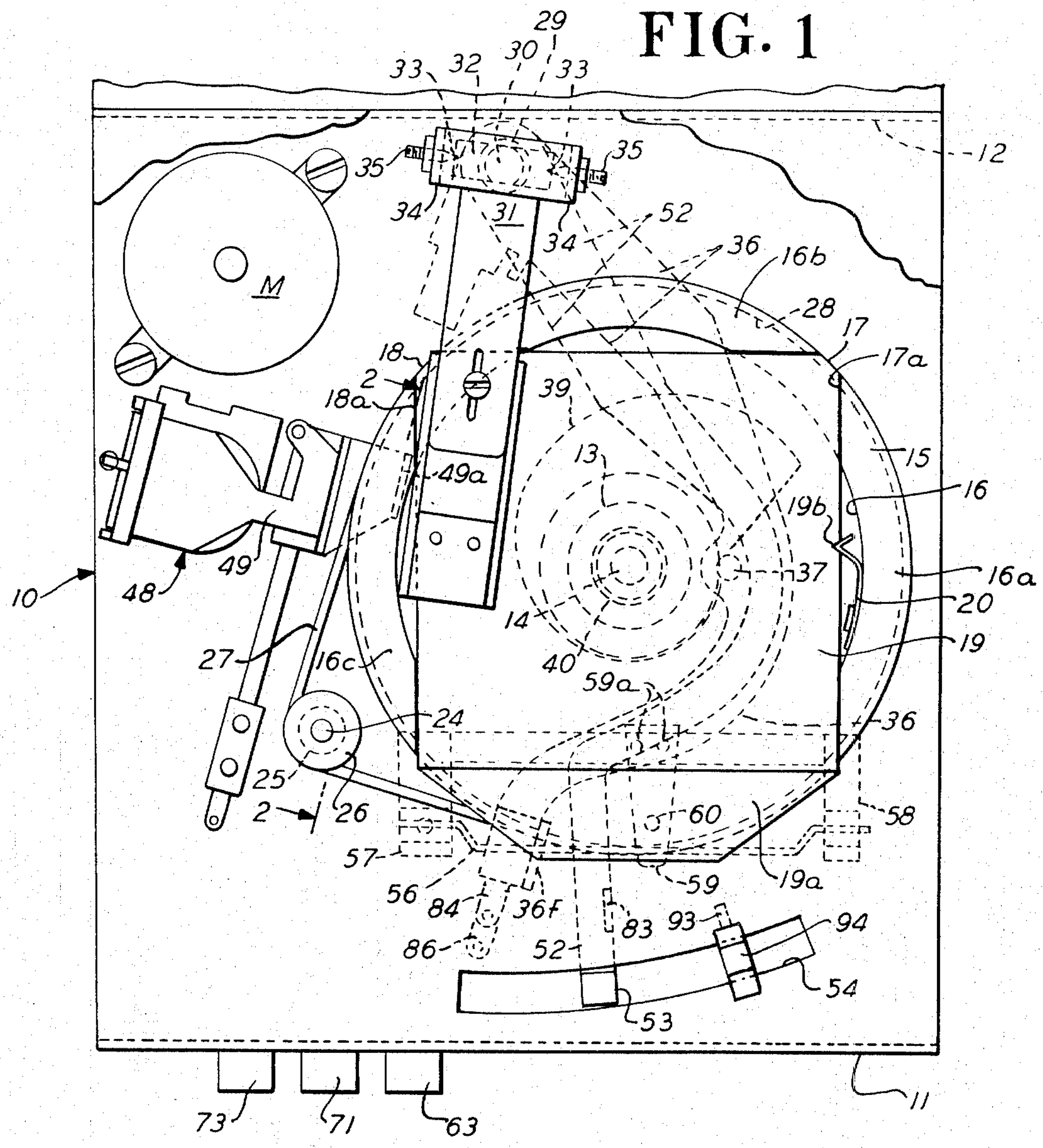
FIG. 1 is a top plan view of the present machine.

The present machine has a U-frame 10 with turned down flanges 11 and 12 at the front and back. Secured to the frame at a midposition slightly offset to the right is a flanged bearing 13 in which a shaft 14 is journaled. Mounted on this shaft is a turntable 15 having a raised border 16 extending three-fourths therearound, which is divided by notches 17 and 18 at 90° intervals into three right angle quadrants **16*a*, 16*b* and 16*c* to form a rectangular recess open at one side. The opposite quadrants 16*a* and 16*c* have parallel internal edges for receiving a rectangular record into a mounted position on the turntable via the open end of the border. In the mounted position, the two back corners of the record 19 engage the notches 17*a* and 18*a*. The record comprises a rectangular semiflexible plastic sheet faced by a square magnetic coating on one side. The plastic sheet is extended at one end to form a tab 19*a* which extends slightly beyond the peripheral edge of the turntable when the record is in mounted position so as to provide a handle by which the record can be easily mounted and removed. The handle also enables notations to be written erasably thereon pertaining to the recorded announcement. A notch 19b in one side of the record is engaged by a light cantilever spring 20** on the turntable to releasably hold the record in mounted position.

A drive motor M for the turntable is mounted vertically on the left rear portion of the frame 10. The motor is coupled to the turntable by a two-stage reduction comprising a belt 21 (FIG. 2) between a lower drive spindle 22 of the motor and an intermediate pulley 23 mounted on a shaft 24 journaled in a bearing 25 at the front left side of the turntable. Mounted on the upper end of the shaft 24 is a pulley 26 (FIG. 1) engaged by a belt 27 which rides in a peripheral groove 28 around the turntable.

Figure 2:
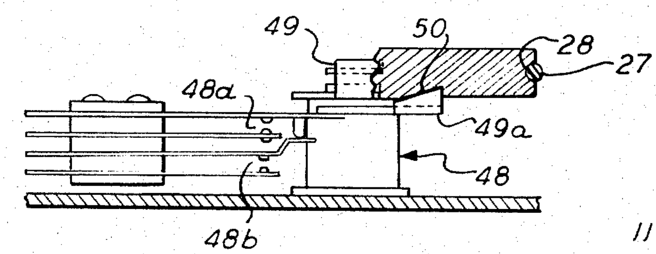
FIG. 2 is a fractional section on the line 2—2 of FIG. 1.

In the frame 10 at the rear left side of the turntable is a vertical bearing 29 receiving a shaft 30 for a tone arm 31 (FIG. 1). This shaft has a block 32 secured to the upper end thereof on the opposite ends of which are bearing holes 33. The tone arm 31 is provided with a pair of downwardly turned lugs 34 at its rearward end through which are threaded pivot screws 35 that engage the bearing holes 33 to provide the tone arm with a vertical freedom of movement. Secured to the lower end of the shaft 30 is an actuator arm 36 for the tone arm. This actuator arm curves around the right side of the turntable shaft (FIG. 1) and terminates near the front of the frame 10 midway the sides thereof. At its midpoint adjacent the turntable shaft the actuator arm has a depending stud on which is journaled a roller 37. A spring 38 (FIG. 2) biases the actuator arm 36 clockwise, as viewed from the top of the machine, causing the roller 37 to follow a spiral cam 39 journaled on the turntable shaft 14. This cam is staked to the lower end of a tubular bearing 40 traversing the bearing 13 aforementioned and receiving the turntable shaft 14. The turntable drives this cam through a stepdown gear train 41 comprising a pinion gear **41*a* on the turntable shaft meshing with a larger gear 41*b* on a shaft 42 journaled in a bearing 42*a*, and a pinion gear 43*a* on the shaft 42 meshing with a larger gear 43*b* secured to the upper end of the tubular bearing 40. Thus, as the turntable is rotated the tone arm 31 is gradually turned counterclockwise, as viewed from the top of the machine, to define a spiral track on the record 19. When the turntable has rotated a sufficient number of revolutions to move the tone arm across the record the roller 37 rides off the outer end of the cam 39 and the actuator arm 36 is snapped back by the spring 38 to return the tone arm to its start position at the outer track of the record 19. As the actuator arm 36 is returned to its start position a finger 44 extending fromm the hub of the arm moves against a cantilever spring 45 of a home switch 46 to break a power supply circuit 47** the effect of which is to stop the motor M as is later described.

In order that the turntable will always come to rest in the same load-unload position when the motor is stopped — i.e., a position wherein the tab 19a of the record is extending forwardly of the machine for easy grip of the hand, the machine is provided with a relay 48 for latching the turntable in the desired load-unload position. This relay is mounted in an upright position at the left of the turntable and is provided with a pivoted armature 49 which extends across the core of the relay and terminates in a latch member **49*a* below the turntable. This armature is biased upwardly causing the latch member to engage slidably the under face of the turntable. In this bottom face of the turntable is a recess 50 (FIG. 2) to receive the latch member 49*a* and stop the turntable in the desired position. When the home switch 46 is opened by return of the actuator arm to home position the latch relay 48 is dropped out as is later described with reference to FIG. 5, but in the first instance the latch member 49 is released against the bottom face of the turntable to keep the motor energized until the latch member engages the recess 50** at which instant the current to the motor is cut off and the turntable stopped.

A first portion of the recordable space on the record 19 is used for recording an announcement to be played back when a subscriber calls and the machine is set for automatic playback, as when there is no one at home to answer the calls. The point on the record track where the announcement ends is marked by the setting of a memory arm 52 which is moved with the actuator arm 36 during the recording of the announcement. At the end of the recording of the announcement the memory arm is released from the actuator arm 36 and detented in its operated position but the machine continues to run until the cam 39 completes a full turn at which time it is automatically shut off as is herein next described.

Figure 3:
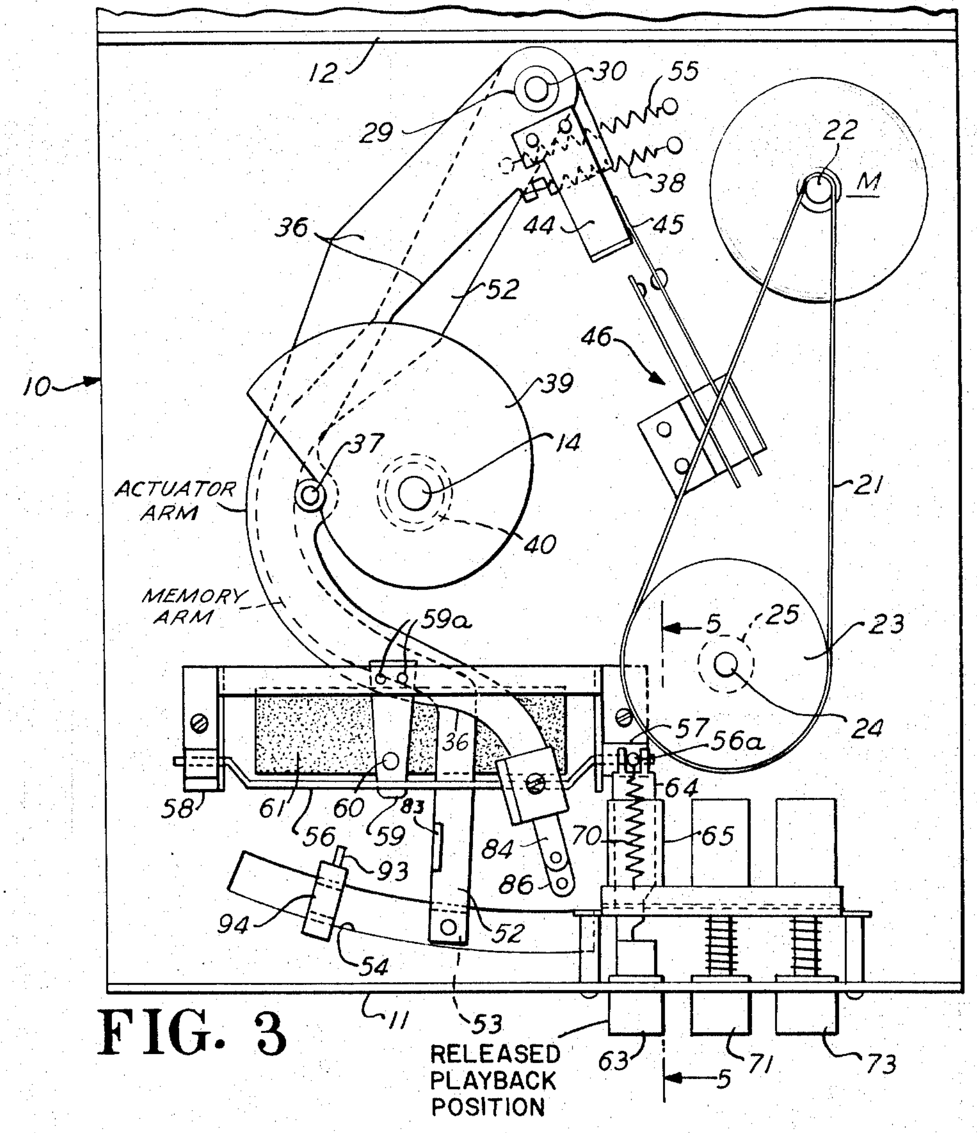
FIG. 3 is a bottom plan view of the machine.

The memory arm 52 overlies the actuator arm 36 and is pivoted coaxially therewith in the bearing 29. Also, the memory arm extends to the front middle portion of the frame 10 whereat it has a manual push button 53 projecting upwardly through an arcuate opening 54 in the frame. The memory arm is likewise biased clockwise, as seen from the top of the machine, by a tension spring 55 (FIG. 3) connected between it and the frame 10. Below the forward part of the memory arm 52 along the path thereof is a bail 56 pivoted at its ends in lugs 57 and 58 depending from the frame 10. Secured by two rivets **59*a* to the underside of the memory arm is a cantilever spring 59 which rides at its free end on the bail 56, and secured to the spring adjacent to the bail is a depending drive pin 60 which extends into the pathway of an upright flange 36f of the actuator arm 36 when the bail 56 is in lowered position to cause the actuator arm to move the memory arm therewith. When the bail is raised the pin 60 is lifted free of the actuator arm 36 and the forward part of the memory arm is pressed upwardly against a friction pad 61 on the underside of the frame 10 so as to retain the memory arm in its operated position. The push button 53 allows the memory arm 52 to be disengaged from the friction pad 61** and to be reset at will.

Figure 5:
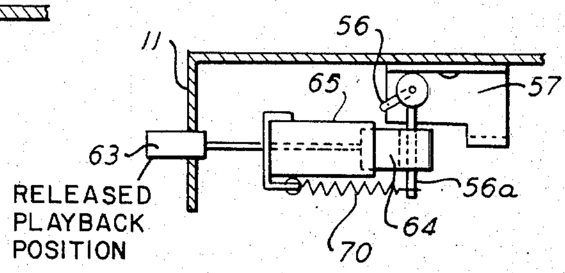
FIG. 5 is a fractional sectional view taken on the line 5—5 of FIG. 3.

When the user wants to record an announcement, he holds a record button 63 pressed at the front of the frame 10 (FIGS. 1 and 5). This moves a plunger 64 against a downwardly extending radial arm **56*a* (FIGS. 3 and 5) on one end of the bail 56 to turn the bail downwardly so as to free the memory arm 52 from the friction pad 61 and to lower the drive pin 60 into the pathway of the actuator arm 36. Also, this operation of the record button 63 shifts a record switch 65 from its "a" to "b" contacts (FIG. 6) to connect the latch relay 48** across a *dc* power source indicated by the terminals 66, and it throws also a record-reproduce switch 67 so that the user can speak into a microphone 68 to record via an amplifier 69 into the record head 31r of the tone arm 31. Operation of the latch relay closes its "*a*" contacts to start the drive motor M running to rotate the turntable . During the time of this recording the actuator arm 36 is moving slowly counterclockwise, as seen from the top of the machine to feed the tone arm progressively across the record, and the memory arm 52 is pushed by the actuator arm in advance thereof.

Figure 4:
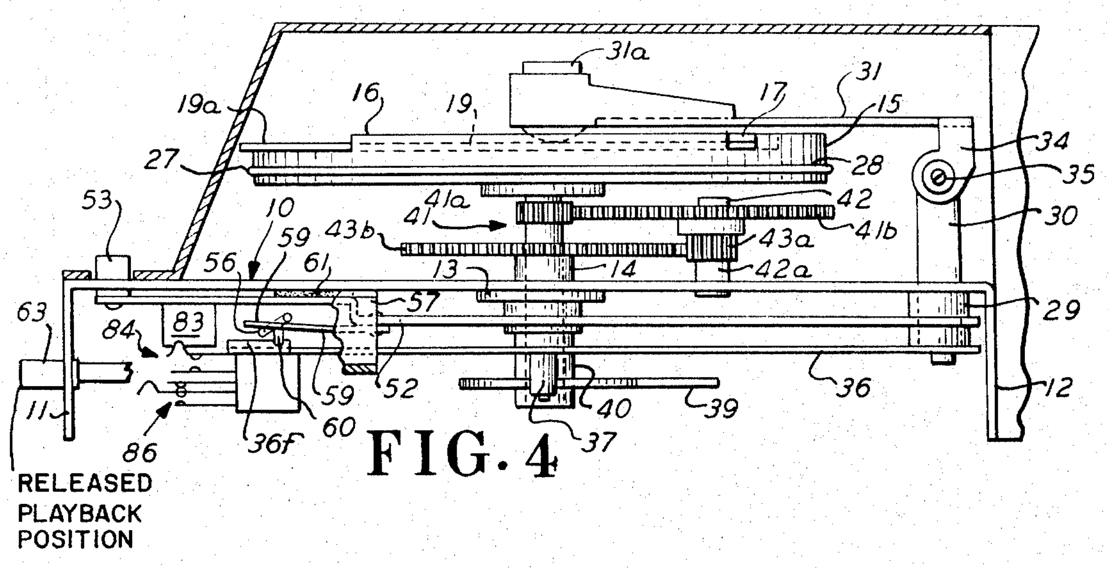
FIG. 4 is a right-hand elevational view of the machine with parts broken away.

When the user finishes recording his announcement he releases the record switch button 63 retracting the plunger 64 to cause the bail 56 to be raised by a return spring 70 both to disengage the drive pin 60 from the actuator arm 36 and to press the forward end portion of the memory arm 52 against the friction pad 61 to retain the memory arm in its "announcement-end position" (FIG. 4). Although the record switch 65 is returned to its "a" contact the latch relay 48 is held energized via the home switch 46. The motor is thus kept running to advance the actuator arm 36 past the memory arm to its end position whereat the roller 37 runs off the cam 39 to allow the tone arm to be snapped back to home position and the home switch 46 is thereupon opened to drop out the latch relay (FIG. 6) and cause the turntable to come to a stop when it next reaches its latch position.

Figure 6:
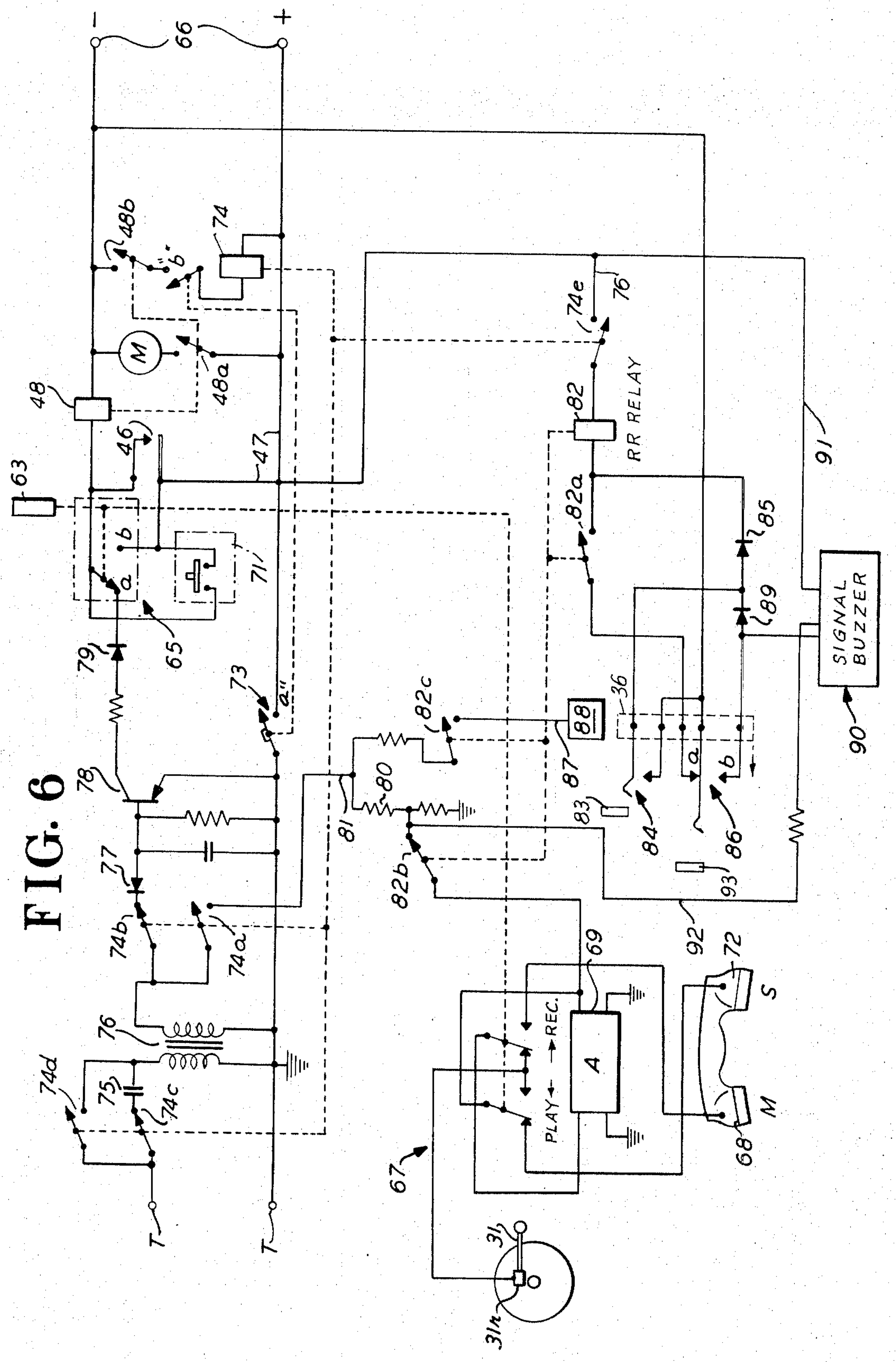
FIG. 6 is a schematic circuit diagram of the audio and control circuits of the machine.

After the user has recorded the announcement he may check the announcement simply by pressing a check switch 71 momentarily at the front of the machine(FIGS. 1 and 6). The closing of this check switch pulses the latch relay 48 causing the latch arm 49 to be removed from the notch 50 in the turntable and the contacts 48a to be closed to start the motor M rotating the turntable. Since upon release of the record button 63 the record-reproduce switch 67 is returned to its playback position (as shown) wherein it connects the head 31r to the input of the amplifier 69 and the output of the amplifier to a speaker 72 the recorded announcement is immediately played back and heard by the user. Note that the check switch 71 need be pressed only momentarily because it starts instantly rotating the turntable with the result that upon release of the check switch the latch member 49a is held by its engagement with the bottom face of the turntable to hold the motor switch **48*a* operated and before one revolution of the turntable is completed the actuator arm has been moved sufficiently to close the home switch 46 with the result that the latch relay is maintained operated and the motor M is kept energized. When the playback of the announcement is completed the actuator arm passes the memory arm 52 and the machine will continue to run until a full revolution of the cam 39 is completed at which point the actuator arm 36 is snapped back to home position, the home switch 46** is opened and the machine is restored to its unoperated condition.

In order to place the machine in a telephone answering condition a manual switch 73 (FIGS. 1 and 6) is pressed closed in detented position to place the machine across the telephone line. When an a. c. ringing signal comes over the telephone line it is fed through a switch **74*c* of a seize relay 74, a condenser 75, a transformer 76 and then through a switch 74*b*, diode 77, switching transistor 78, diode 79, record switch 65*a*, latch relay 48, and back through the dc source 66 and switch 73*a* to operate the latch relay whereby to start the playback of the announcement as hereinbefore described. The operation of the latch relay closes a switch 48*b* to complete a circuit through the manual switch 73*b* to activate the seize relay 74. The operation of the seize relay does a number of things: 1) it opens switch 74*c* and closes switch 74*d* across the condenser 75 to provide a dc circuit for the telephone microphone through the transformer 76 whereby to change the impedance of the telephone line to indicate that the telephone has been answered: 2) it opens the switch 74*b* to disconnect the latch relay 48 and it closes a switch 74*a* to connect the head 31*r*, now operating as a reproducer, through the amplifier 69 and through a resistor 80 and via line 81 to the telephone circuit so that the announcement is played back to the subscriber: and 3) it closes a switch 74*e* to provide ground to an RR relay 82** so that it can be later operated at the end of playback of the announcement, as will appear.

When at the end of playback of an announcement the actuator arm 36 passes the memory arm 52 a cam 83 on the memory arm closes a switch 84 mounted on the end of the actuator arm to connect the RR relay 82 across the power terminals 66 via the switch **74*e*, RR relay 82, diode 85 and switch 84. As the RR relay is operated its contacts 82*a* are closed to complete a hold circuit for the relay via a second switch 86** ("*a*" contacts) also mounted on the end of the actuator arm 36 at a point below and beyond the switch 84. The RR relay also opens switch **82*b* to disconnect the telephone line from the amplifier 69 connected to the head 31*r*, closes a switch 82*c* to connect the telephone line to the audio input 87 of a message recorder 88 and, by a switch of the RR relay 82 not shown, the message recorder is started running. At the instant the switch 84 was closed it fed power from negative terminal of power source 66 through diode 89 to a buzzer 90 and back by lead 91 to the positive terminal of this power source. The buzzer is therefore activated to feed a signal momentarily via a line 92** into the telephone line to apprise the subscriber that he may now record any desired message.

When the tone arm 31 reaches the end of its travel across the record, or alternatively reaches any other desired set point, a cam 93 on a settable stop member 94 mounted in the arcuate slot 54 of the frame 10 operates the switch 86 from its a to b contacts to drop the RR relay and to thereupon activate the buzzer 90 again to feed a signal into the telephone line via the lead 92 to apprise the subscriber that the period for recording a message has ended. When in the continuing movement of the actuator arm 36 the roller 37 rides off the high point of the cam 39 the actuator cam 36 is snapped back to home position and opens the home switch 46 to deenergize the latch relay 48. The result of dropping the latch relay is that as soon thereafter as the recess 50 in the bottom of the turntable registers with the latch member **49*a* the switch 48*a* is opened to stop the drive motor and the switch 48*b* is opened to drop the seize relay 74. This completes the cycle to return the machine into a standby condition for receipt of another call. If another subscriber calls before the cycle is completed, a busy signal will be received because the telephone line remains seized by switch 74*d* remaining closed until the seize relay 74** is dropped.

The embodiment of our invention herein particularly shown and described is intended to be illustrative and not necessarily limitative of our invention, since the same is subject to changes and modifications without departure from the scope of our invention which we endeavor to express according to the following claims.

We claim:

1. In an apparatus for making announcements to subscribers over a telephone line and for recording messages from said subscribers: the combination of an announcement recorder-reproducer comprising a turntable, a drive motor for rotating said turntable, a tone arm for a record-reproduce head mounted for movement across said turntable, a pivoted actuator arm coupled to said tone arm and operated from a home position to advance said tone arm as the turntable is rotated, a memory arm along said actuator arm pivoted for unitary travel therewith, a record-reproduce control biased into reproduce position and depressible into record position for shifting said announcement recorder-reproducer into recording condition, means rendered operative upon depressing said record-reproduce control into record position for starting and maintaining said drive motor running until said actuator arm is advanced to its end of travel and returned to home position, means including a bail along a first portion of travel of said memory arm for shifting the memory arm into drive engagement with said actuator arm as said record-reproduce control is pressed into record position and for freeing the memory arm from the actuator arm and detenting the memory arm in its operated position when said record-reproduce control is released to reproduce position, a message recorder-reproducer, and means operable to start said announcement recorder-reproducer in playback including control means to cause said message recorder-reproducer to be started as said actuator arm is moved past said memory arm for recording a message from a subscriber after playback of an announcement.

2. The apparatus set forth in claim 1 including a frame, a pivot shaft in said frame, means pivotally connecting said tone arm to one end of said shaft, means connecting said actuator arm to the other end of said shaft for unitary travel with said tone arm, said memory arm being extended along said actuator arm and being pivoted for unitary movement therewith, a pin on said memory arm in the path of said actuator arm for causing the memory arm to be advanced by the actuator arm during the recording of an announcement, and wherein said memory arm is shifted by said bail crosswise of its path of travel to uncouple it from said actuator arm and to press it frictionally against said frame to retain it in its operated position as said announcement recorder-reproducer is conditioned for playback.

3. The apparatus set forth in claim 1 including an announcement check control depressible while said record-reproduce control is in reproduce position to start said announcement recorder-reproducer running to advance said actuator arm through its travel range to its end position and thereupon stop said drive motor and return the actuator arm to home position whereby said recorded announcement is played back and said announcement recorder-reproducer is returned to a standby reproduce condition.

4. The apparatus set forth in claim 1 including a switch on said actuator arm operable by said memory arm as the actuator arm is advanced past the memory arm for connecting said telephone line to said message recorder-reproducer and for starting the same and signalling the subscriber that the apparatus is ready for recording a message, a second switch on said actuator arm and a settable stop ahead of said memory arm in the path of said actuator arm for operating said second switch to shut off said message recorder-reproducer and to signal the subscriber that the period for a message recording is ended.

5. The apparatus set forth in claim 1 wherein said announcement recorder-reproducer includes timing means for stopping said message recorder-reproducer when said actuator arm reaches a preset position past said memory arm.

6. The apparatus set forth in claim 1 wherein said bail is positioned below said memory arm and said memory arm is biased against said bail for lowering and raising the memory arm into and out of coupled relationship with said actuator arm as said record control is depressed and released.

7. The apparatus set forth in claim 6 including a friction pad above a first portion of travel of said memory arm against which said memory arm is pressed by said bail to detent the memory arm in operated position as said record control is released into reproduce position.

8. The apparatus set forth in claim 1 including a conditioning control shiftable into a telephone answering position to connect said telephone line to said announcement recorder-reproducer and to start the announcement recorder-reproducer to play back said announcement responsive to a ringing signal from a subscriber, including switch means operable by movement of said actuator arm past said memory arm to connect said telephone line to said message recorder-reproducer and to start the message recorder-reproducer running.

9. The apparatus set forth in claim 8 including signaling means and settable means for triggering said signaling means at any desired point of travel of said actuator arm past said memory arm for feeding a steady signal into the telephone line to apprise the subscriber that the period for recording a message has ended.

10. The apparatus set forth in claim 8 including means operative upon said actuator arm being advanced to its end of travel for causing both said announcement recorder-reproducer and message recorder-reproducer to be returned to a standby condition with said announcement recorder-reproducer in reproduce condition and said actuator arm in home position to render the apparatus ready for receipt of another telephone call.

* * * * *